United States Patent
Shibamori

(10) Patent No.: US 10,942,693 B2
(45) Date of Patent: Mar. 9, 2021

(54) INFORMATION PROCESSING APPARATUS, METHOD OF CONTROLLING THE SAME, AND STORAGE MEDIUM

(71) Applicant: CANON KABUSHIKI KAISHA, Tokyo (JP)

(72) Inventor: Tomoki Shibamori, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/409,647

(22) Filed: May 10, 2019

(65) Prior Publication Data

US 2019/0361648 A1 Nov. 28, 2019

(30) Foreign Application Priority Data

May 28, 2018 (JP) .............................. JP2018-101393

(51) Int. Cl.
*G06F 3/12* (2006.01)

(52) U.S. Cl.
CPC .......... *G06F 3/1254* (2013.01); *G06F 3/1204* (2013.01); *G06F 3/1205* (2013.01); *G06F 3/1248* (2013.01)

(58) Field of Classification Search
CPC .... G06F 3/1254; G06F 3/1204; G06F 3/1205; G06F 3/1206; G06F 3/1248
See application file for complete search history.

(56) References Cited

U.S. PATENT DOCUMENTS

| 9,244,670 | B2 | 1/2016 | Yasui | |
| 2012/0105890 | A1* | 5/2012 | Furuya | G06F 3/1212 358/1.13 |
| 2013/0155458 | A1* | 6/2013 | Kanakubo | G06F 3/1204 358/1.15 |

FOREIGN PATENT DOCUMENTS

JP 2014-10480 1/2014

* cited by examiner

*Primary Examiner* — Moustapha Diaby
(74) *Attorney, Agent, or Firm* — Venable LLP

(57) ABSTRACT

An information processing apparatus includes: a printer driver configured to generate page description language data based on drawing data in a first format; an application configured to generate drawing data in a second format different from the first format; and a conversion unit of an operating system, the conversion unit configured to perform a conversion process of converting drawing data in the second format into drawing data in the first format. The information processing apparatus comprises a generation unit configured to generate data that does not require the conversion process by the conversion unit of the operating system in a case where a printer driver selected by a user using the application is the printer driver configured to generate page description language data based on drawing data in the first format. The printer driver generates page description language data based on the data generated by the generation unit.

15 Claims, 12 Drawing Sheets

```
<?xml version="1.0" encoding="UTF-8"?>
<psf:PrintTicket
 xmlns:psf="http://schemas.xxxxxxx.com/xxxxxxxx/2003/08/printing/printschemaframework"
 xmlns:xsi="http://www.w3.org/2001/XMLSchema-instance"
 xmlns:xsd="http://www.w3.org/2001/XMLSchema" version="1"
 xmlns:ns0000="http://www.xxxxx.com/ns/printschema/inkjet/v100"
 xmlns:psk="http://schemas.xxxxxxx.com/xxxxxxx/2003/08/printing/printschemakeywords">
```
~ 700

```
<psf:Feature name="psk:PageOutputQuality">
 <psf:ParameterInit name="psk:PageMediaSizeMediaSizeWidth">
              .
              .
              .
```
~ 710

```
<psf:Property name="ns0000:PagePrintImageParam">
 <psf:Property name="ns0000:MediaPixelSizeWidth">
   <psf:Value xsi:type="xsd:integer">2517</psf:Value>     ~721
 </psf:Property>
 <psf:Property name="ns0000:MediaPixelSizeHeight">
   <psf:Value xsi:type="xsd:integer">29761</psf:Value>    ~722
 </psf:Property>
 <psf:Property name="ns0000:ImageablePixelSizeWidth">
   <psf:Value xsi:type="xsd:integer">2509</psf:Value>     ~723
 </psf:Property>
 <psf:Property name="ns0000:ImageablePixelSizeHeight">
   <psf:Value xsi:type="xsd:integer">29753</psf:Value>    ~724
 </psf:Property>
 <psf:Property name="ns0000:OffsetX">
   <psf:Value xsi:type="xsd:integer">4</psf:Value>        ~725
 </psf:Property>
 <psf:Property name="ns0000:OffsetY">
   <psf:Value xsi:type="xsd:integer">4</psf:Value>        ~726
 </psf:Property>
 <psf:Property name="ns0000:ResolutionX">
   <psf:Value xsi:type="xsd:integer">42</psf:Value>       ~727
 </psf:Property>
 <psf:Property name="ns0000:ResolutionY">
   <psf:Value xsi:type="xsd:integer">42</psf:Value>       ~728
 </psf:Property>
</psf:Property>
</psf:PrintTicket>
```
~ 720

FIG.7

```
<?xml version="1.0" encoding="UTF-8"?>
<psf:PrintTicket
xmlns:psf="http://schemas.xxxxxx.com/xxxxxxxx/2003/08/printing/printschemaframework"
xmlns:xsi="http://www.w3.org/2001/XMLSchema-instance"
xmlns:xsd="http://www.w3.org/2001/XMLSchema" version="1"
xmlns:ns0000="http://www.xxxxx.com/ns/printschema/inkjet/v100"
xmlns:psk="http://schemas.xxxxxxxxx.com/xxxxxxx/2003/08/printing/printschemakeywords">
  <psf:Feature name="psk:PageOutputQuality">
  <psf:ParameterInit name="psk:PageMediaSizeMediaSizeWidth">
         .
         .
         .

<psf:Property name="ns0000:PagePrintImageParam">
    <psf:Property name="ns0000:Enable">
       <psf:Value xsi:type="xsd:string">Mode1</psf:Value>
    </psf:Property>
    <psf:Property name="ns0000:MediaPixelSizeWidth">
       <psf:Value xsi:type="xsd:integer">2517</psf:Value>
    </psf:Property>
    <psf:Property name="ns0000:MediaPixelSizeHeight">
       <psf:Value xsi:type="xsd:integer">29761</psf:Value>
    </psf:Property>
    <psf:Property name="ns0000:ImageablePixelSizeWidth">
       <psf:Value xsi:type="xsd:integer">2509</psf:Value>
    </psf:Property>
    <psf:Property name="ns0000:ImageablePixelSizeHeight">
       <psf:Value xsi:type="xsd:integer">29753</psf:Value>
    </psf:Property>
    <psf:Property name="ns0000:OffsetX">
       <psf:Value xsi:type="xsd:integer">4</psf:Value>
    </psf:Property>
    <psf:Property name="ns0000:OffsetY">
       <psf:Value xsi:type="xsd:integer">4</psf:Value>
    </psf:Property>
    <psf:Property name="ns0000:ResolutionX">
       <psf:Value xsi:type="xsd:integer">42</psf:Value>
    </psf:Property>
    <psf:Property name="ns0000:ResolutionY">
       <psf:Value xsi:type="xsd:integer">42</psf:Value>
    </psf:Property>
  </psf:Property>
</psf:PrintTicket>
```

FIG.11

INFORMATION PROCESSING APPARATUS, METHOD OF CONTROLLING THE SAME, AND STORAGE MEDIUM

BACKGROUND OF THE INVENTION

Field of the Invention

The present invention relates to information processing apparatuses, methods of controlling the same, and storage media.

Description of the Related Art

Generally, an application on a host computer having Windows (registered trademark) developed by Microsoft Corporation as the OS prints images or documents with a printer according to a printing procedure as illustrated in FIG. 1. An application 102 converts drawing data into a spool file and then passes the converted file to a spooler 104, which passes the stored spool file to a printer driver 106. The printer driver 106 converts the spool file into data described in a page description language (PDL) based on a printer language (such data is referred to as page description language data or PDL data, for example) and sends the converted data to a printer 110. The printer 110 executes printing based on the sent PDL data.

In some configurations, spool files stored in the spooler 104 have multiple types of formats in the above printing procedure, and applications on the host computer 100 handle different types of print data formats. For example, as illustrated in FIG. 2, a Win32 application 210 uses a spool file (EMF file) 211 described in a data format called EMF (Enhanced Metafile) to perform printing via a GDI printer driver 212. On the other hand, a WPF application 220 uses a spool file (XPS file) 221 described in a data format called XPS (XML Paper Specification) to perform printing via an XPS printer driver 222.

Here, EMF files and XPS files can be converted bidirectionally by a conversion process of the OS-for example, converting an EMF file into an XPS file, or converting an XPS file into an EMF file. Thus, data can be passed from the Win32 application 210 to the XPS printer driver 222 via a GDI-to-XPS conversion unit 230. Also, data can be passed from the WPF application 220 to the GDI printer driver 212 via an XPS-to-GDI conversion unit 240.

Unfortunately, there is a problem. Since drawing commands supported by the EMF format and the XPS format are different, conversion of a drawing command that is supported by only one of those formats may result in deterioration of image quality or a loss of part of the information, and fail to offer the output results as intended by the user. Japanese Patent Laid-Open No. 2014-010480 discloses a technique of recommending installation of an XPS driver or a GDI driver depending on the circumstances.

SUMMARY OF THE INVENTION

However, even with the technique in Japanese Patent Laid-Open No. 2014-010480, the user's neglect of installing a recommended printer driver may make it difficult to solve the above problem that output results as intended by the user cannot be obtained.

In light of the above situation, an object of the present invention is to reduce chances where output results as intended by the user cannot be obtained in the environment where print data in different formats coexists.

The present invention is an information processing apparatus including: a printer driver configured to generate page description language data based on drawing data in a first format; an application configured to generate drawing data in a second format different from the first format; and a conversion unit of an operating system, the conversion unit configured to perform a conversion process of converting drawing data in the second format into drawing data in the first format, in which the information processing apparatus comprises a generation unit configured to generate data that does not require the conversion process by the conversion unit of the operating system in a case where a printer driver selected by a user using the application is the printer driver configured to generate page description language data based on drawing data in the first format, and the printer driver generates page description language data based on the data generated by the generation unit.

Further features of the present invention will become apparent from the following description of exemplary embodiments with reference to the attached drawings.

BRIEF DESCRIPTION OF THE DRAWINGS

FIG. 7 is a diagram illustrating a PrintTicket in the first embodiment;

FIG. 11 is a diagram illustrating a PrintTicket in the second embodiment; and

DESCRIPTION OF THE EMBODIMENTS

Hereinafter with reference to the drawings, embodiments of the present invention will be described in detail. Note that the following embodiments are not intended to limit the present invention according to the claims, but all the combinations of the features described in the following embodiments are not necessarily essential for problem solving in the present invention.

First Embodiment

<Hardware Configuration of Information Processing Apparatus>

Figure 1:
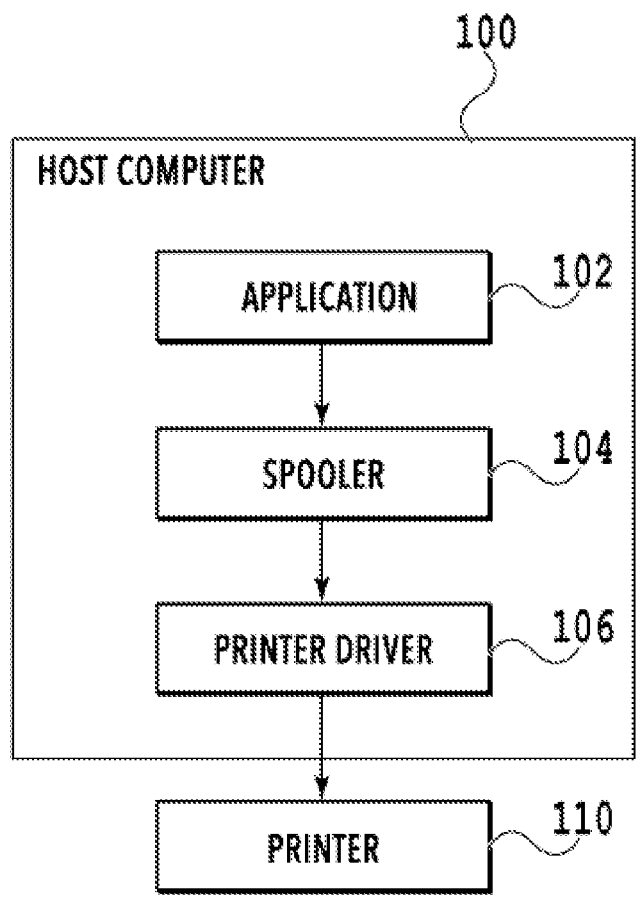
FIG. 1 is an explanatory diagram of a typical printing procedure.
Figure 2:
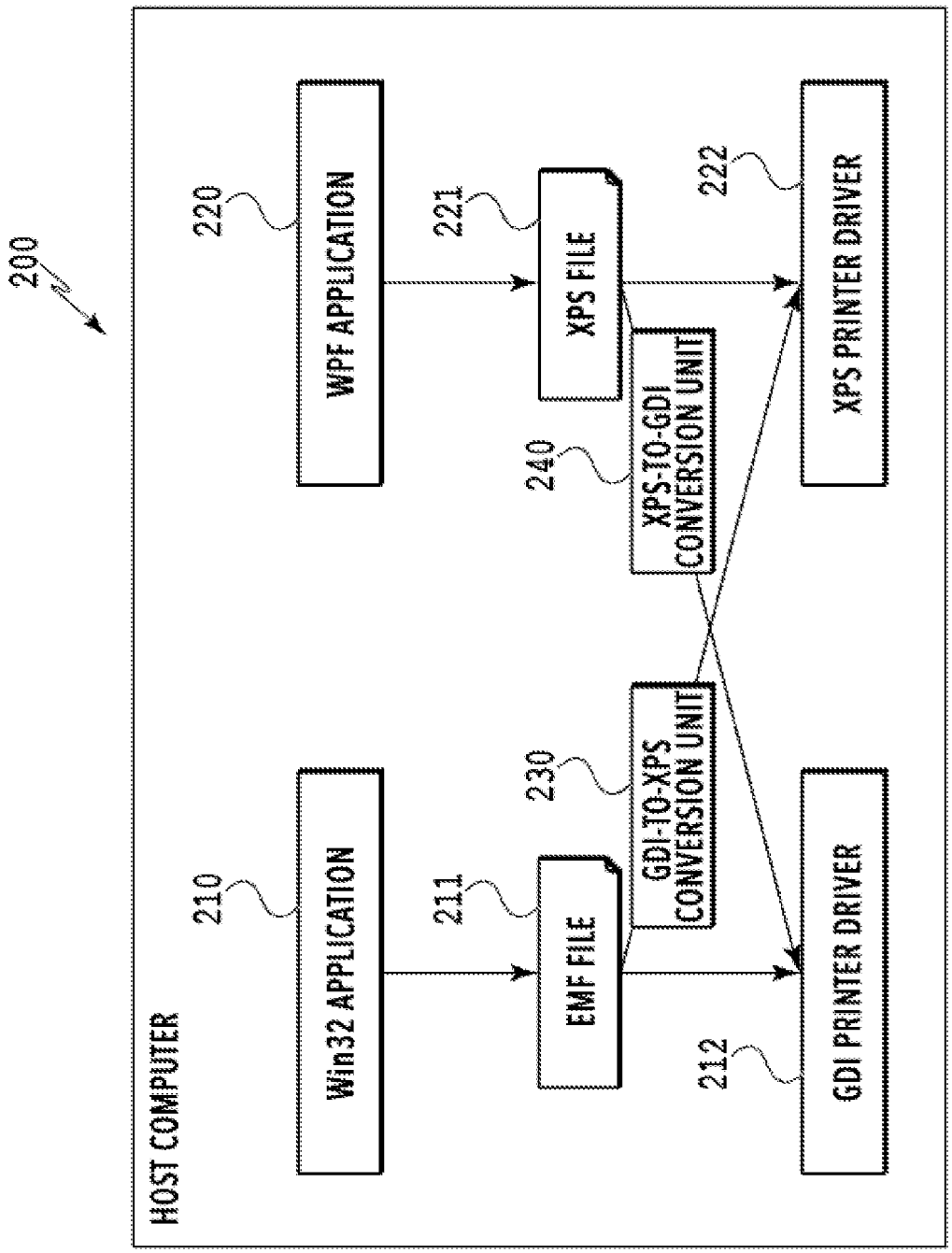
FIG. 2 is an explanatory diagram of a printing procedure in a case where print data in different formats coexists.
Figure 3:
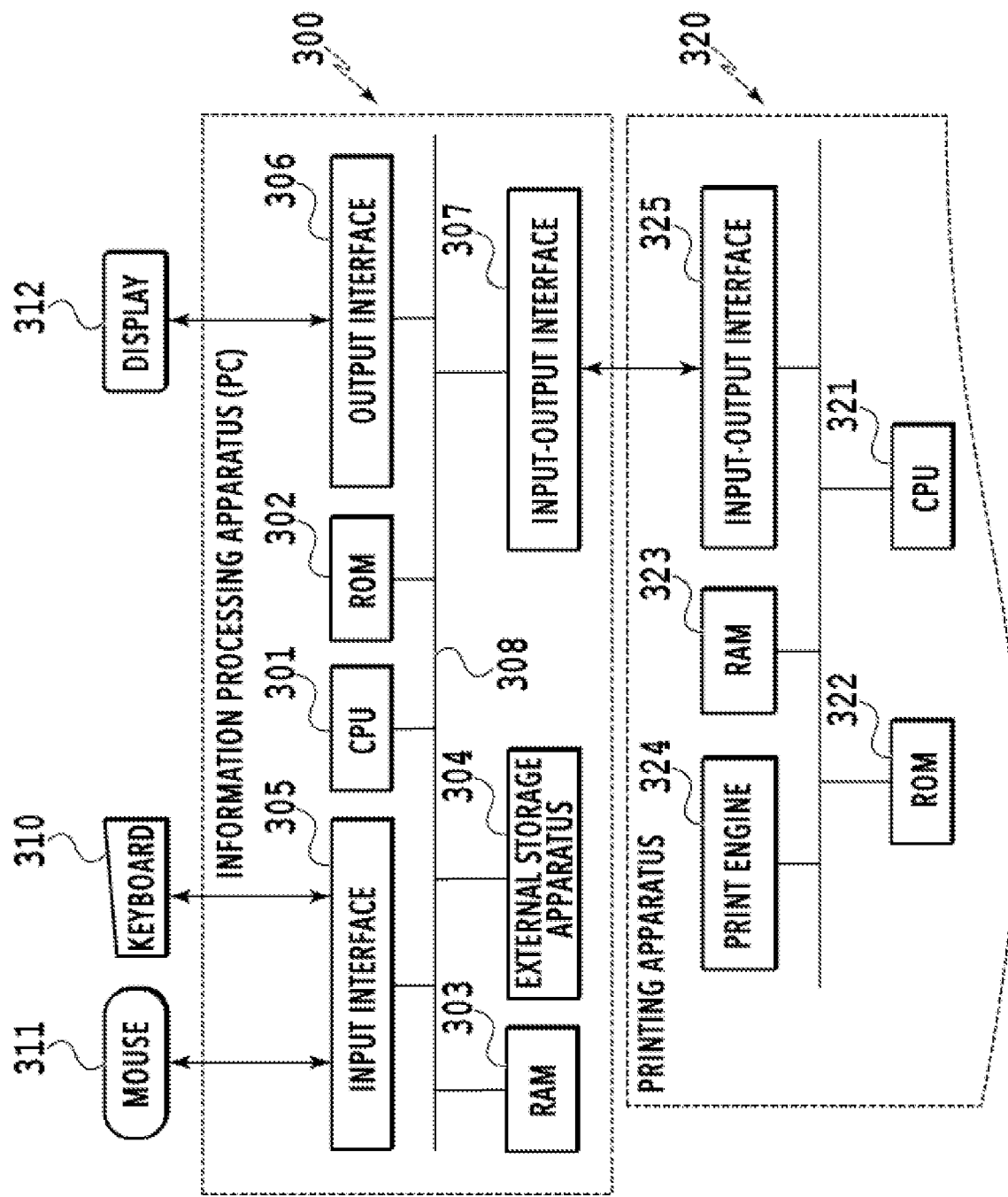
FIG. 3 is a block diagram of a printing system in a first embodiment.

Next, a printing system in the present embodiment will be described with reference to FIG. 3. As illustrated in the figure, the printing system includes an information processing apparatus 300 and a printing apparatus (printer) 320 connected to the information processing apparatus 300. Since an example of the information processing apparatus is a computer, hereinafter the information processing apparatus is abbreviated as PC.

The PC 300 includes a CPU 301, ROM 302, RAM 303, external storage apparatus 304, input interface (hereinafter, an interface is abbreviated as an IF) 305, output IF 306, and input-output IF 307. These components are connected to each other via a bus 308 and thus can transmit and receive data to and from each other.

In the ROM 302, program and data for initialization are stored. In the external storage apparatus 304, a group of application programs, OS (which stands for the operating system), a printer driver, a virtual printer driver, and various kinds of other data are stored. The RAM 303 is a medium to store data temporarily and functions as the main memory and work area of the CPU 301. Specifically, the CPU 301 loads programs stored in the ROM 302 and the external storage apparatus 304 into the RAM 303 and executes the loaded programs. With this operation, the CPU 301 implements software modules described later (see FIG. 4) and executes processes in flowcharts described later (see FIGS. 5, 8, and 9).

The printing apparatus 320 includes a CPU 321, ROM 322, RAM 323, print engine 324, and input-output IF 325. The input-output IF 325 is connected to the input-output IF 307 of the PC 300, which connection enables transmission and reception of data between the PC 300 and the printing apparatus 320. The RAM 323 functions as the main memory and work memory of the CPU 321. For example, the RAM 323 is used as a receiving buffer for storing received print jobs temporarily and as a temporary storage for various pieces of data. The print engine 324 performs printing based on data stored in the RAM 323. The ROM 322 stores control programs and various kinds of data, and according to these control programs, the CPU 321 oversees and controls the components in the printing apparatus 320.

<Software Configuration of Information Processing Apparatus>

Figure 4:
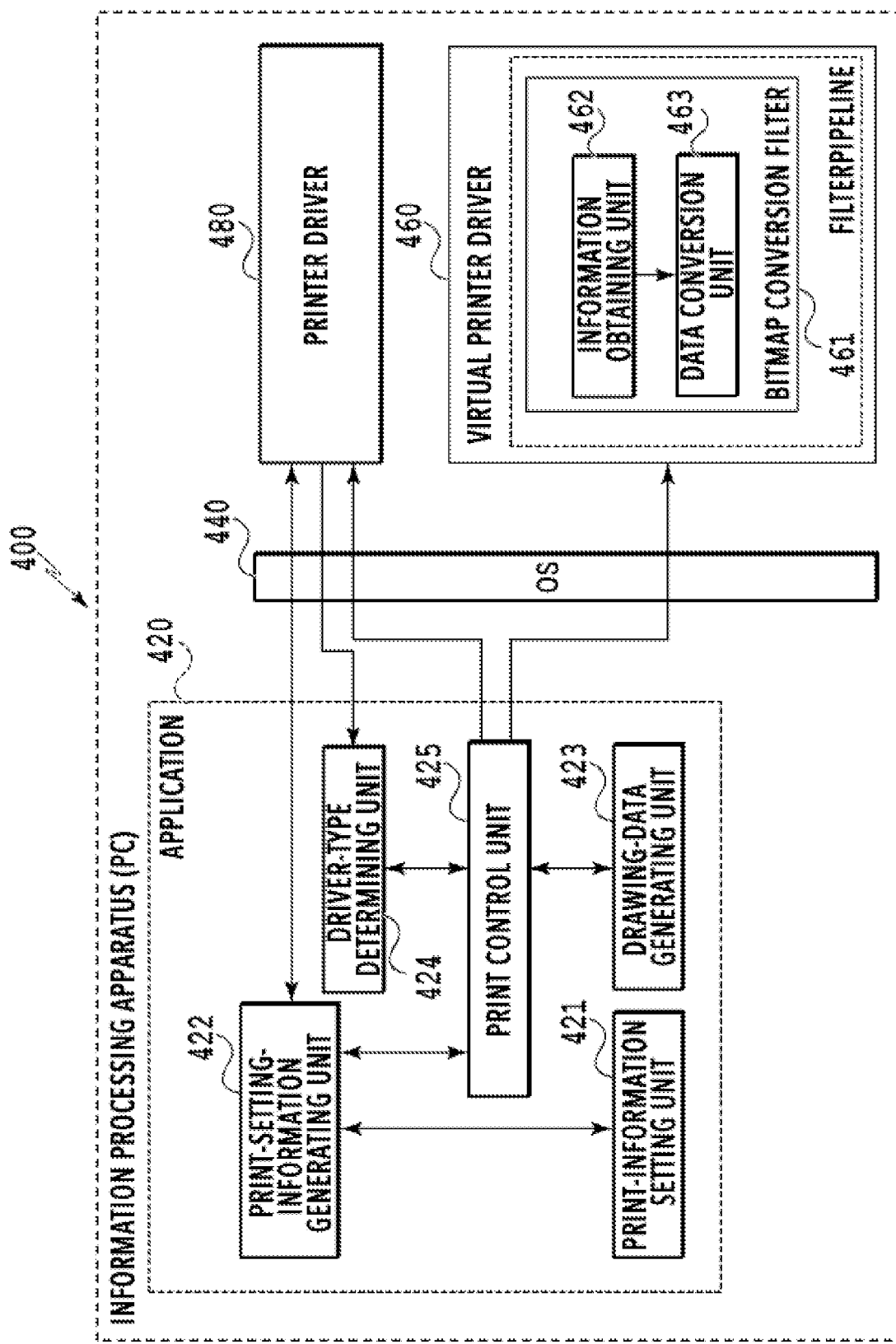
FIG. 4 is a block diagram illustrating the function configuration (software configuration) of an information processing apparatus in the first embodiment.

Next, the software configuration of the information processing apparatus (PC) in the present embodiment will be described with reference to FIG. 4. Note that in the following, the printer driver that does not directly communicate with the printer (that does not directly transmit data to the printer or does not directly receive data from the printer) is called the "virtual printer driver". Also, in the following, an application 420 is called a WPF application, and print setting information is called PrintTicket (which will be abbreviated as PT). In the present embodiment, a virtual printer driver 460 will be described as an XPS printer driver that supports drawing data in the XPS format. In addition, in the present embodiment, a printer driver 480 will be described as a GDI printer driver that supports drawing data in the EMF format. However, configurations to which the present embodiment is applicable are not limited to this one. The present embodiment is applicable to any printing system in which the print data format handled by the application matches the print data format handled by the virtual printer driver.

As illustrated in the figure, a PC 400 includes the application 420, OS 440, virtual printer driver 460, and printer driver 480. The printer driver 480 and the virtual printer driver 460 are device drivers installed in the PC 400.

Next, the virtual printer driver 460 will be described. The virtual printer driver 460 includes a bitmap conversion filter 461 for converting print data (specifically, for converting drawing data in the XPS format into bitmap image data interpretable by the printer driver 480). The bitmap conversion filter 461 includes an information obtaining unit 462 and a data conversion unit 463. The information obtaining unit 462 analyzes print setting information (specifically, PT) received from the application 420 and obtains size information necessary at the data conversion unit 463. The data conversion unit 463 has a function of converting print data into bitmap image data based on the size information obtained by the information obtaining unit 462.

Next, the application 420 will be described. The application 420 includes a print-information setting unit 421, print-setting-information generating unit 422, drawing-data generating unit 423, driver-type determining unit 424, and print control unit 425.

The print-information setting unit 421 has a function of, for example, displaying UI for setting print information on a display 312 to present the UI to the user, and via the UI, the user sets print information such as sheet size, the orientation of sheets, and duplex printing. The print-information setting unit 421 receives print information set by the user.

The print-setting-information generating unit 422 has a function of writing print information set by the print-information setting unit 421 into print setting information (specifically, PT). The print-setting-information generating unit 422 has a function of obtaining capability information on the printer driver based on the print information set by the print-information setting unit 421, and writing the obtained capability information on the printer driver into the print setting information (specifically, into the PT). For example, in a case where A4 is specified as the sheet size, the print-setting-information generating unit 422 obtains capability information on the printer driver related to A4 size. For example, in a case where A4 is specified as the sheet size, and borderless printing is specified, the print-setting-information generating unit 422 obtains capability information on the printer driver related to A4 size and borderless printing.

The drawing-data generating unit 423 has a function of generating drawing data for printing.

The driver-type determining unit 424 has a function of determining the type of a printer driver. The driver-type determining unit 424 receives an instruction to determine the type of a printer driver of interest from the print control unit 425 and returns the determination result to the print control unit 425.

The print control unit 425 has a function of controlling the printer driver based on the determination result by the driver-type determining unit 424. The print control unit 425 also has a function of monitoring predetermined directories. In a case where there is bitmap image data in a predetermined directory, the print control unit 425 passes this bitmap image data to the printer driver 480 (the detail will be described later).

Note that although here, the application 420 and the virtual printer driver 460 are separate pieces, the virtual printer driver may be part of the application. Here, only one virtual printer driver is necessary. In other words, in a system that has, in addition to the application 420, another application with a configuration similar to the application 420, virtual printer drivers are not necessary on an application-by-application basis. Multiple applications can share one virtual printer driver.

<Operation of Application>

Figure 5:
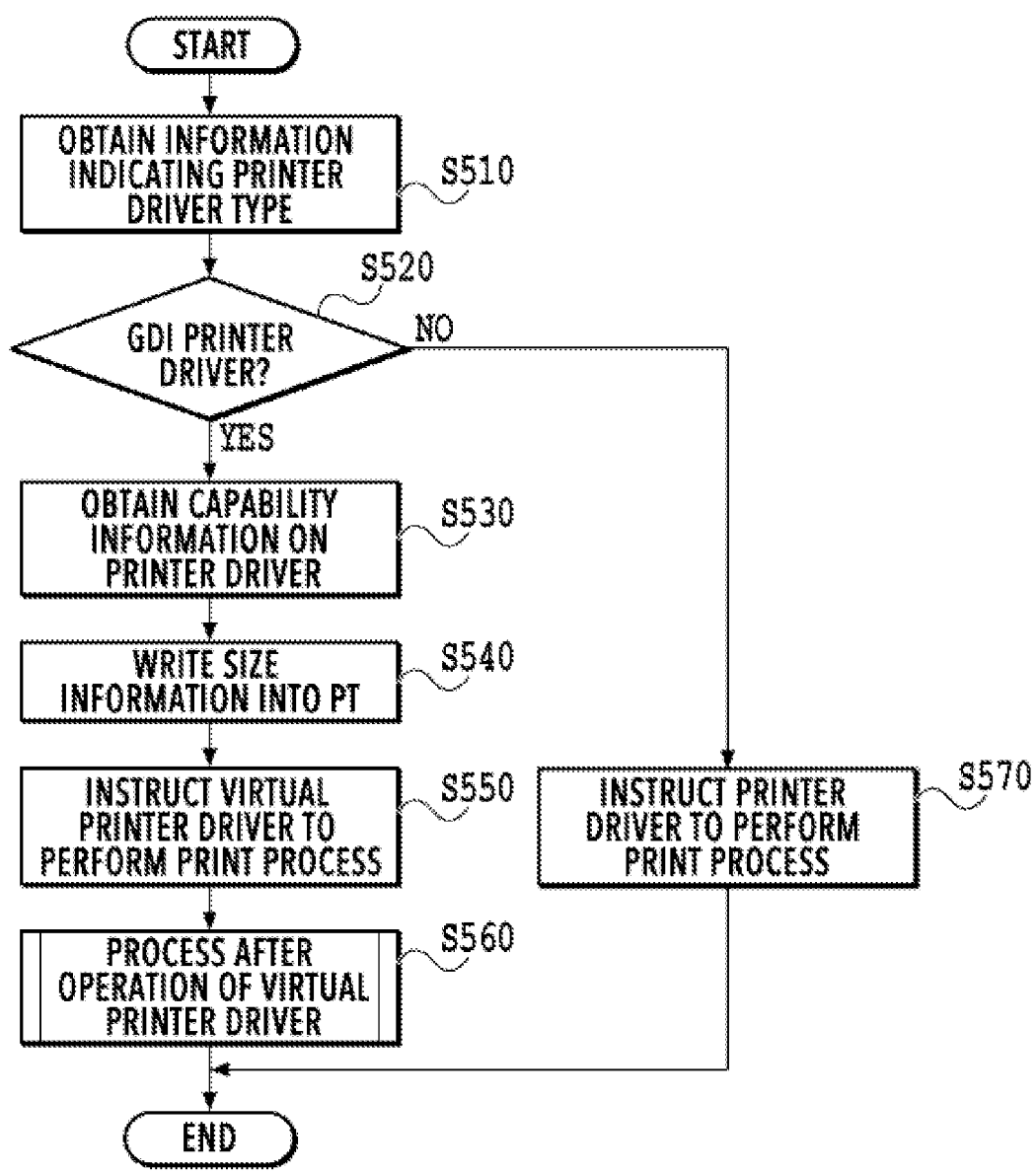
FIG. 5 is a flowchart illustrating the operation of an application in the first embodiment.

Next, description will be provided for the operation of the application 420 in a case where the user performs printing from the application 420, with reference to FIG. 5. Note that the process in FIG. 5 is executed in a case where the user selects a printer driver using the application 420 and gives an instruction to perform printing.

At step S510, the driver-type determining unit 424 obtains information indicating the printer driver type of the printer driver 480 corresponding to the printer specified by the user as the output destination. In the following, "step SXXXX" is simply abbreviated as "SXXXX". For example, in a case of an application using .NET Framework, such as WPF, the IsXpsDevice property in the PrintQueue class can be used to obtain information indicating whether the printer driver of interest is an XPS printer driver.

At S520, the driver-type determining unit 424 determines whether the printer driver 480 is a GDI printer driver, using the information indicating the type of printer driver obtained at S510. In a case where the determination result in this step is true, the process proceeds to S530. On the other hand, in a case where the determination result in this step is false (in other words, in a case where the printer driver is an XPS printer driver), the process proceeds to S570.

First, description will be provided for the case where the determination result at S520 is true. In this case, the print-setting-information generating unit 422, at S530, obtains capability information on the printer driver 480 based on print information for eventually printing with the printer driver 480, set at the print-information setting unit 421. Specifically, the print-setting-information generating unit 422 uses the GetDeviceCaps function to obtain the capability information on the printer driver 480.

At S540, the print-setting-information generating unit 422 extracts size information (such as information including sheet size, drawing area size, resolution, and an offset) from the capability information on the printer driver 480 obtained at S530. Then, the print-setting-information generating unit 422 writes the extracted size information into a default PT received from the virtual printer driver 460.

Note that PTs include PTs in which print setting for the entire print job can be set and PTs in which print setting is allowed on a page-by-page basis. For example, in a case where one print job includes different sheet sizes, size information for each page can be described in a PT capable of print setting on a page-by-page basis to support printing based on such a print job.

The size information written in the default PT is used when the virtual printer driver 460 converts print data in the XPS format into bitmap image data, as described later. In other words, based on information on the drawing area size obtained from the printer driver 480 used for printing, the virtual printer driver 460 generates a bitmap image such that the size of the bitmap image matches this drawing area size. This operation, in a case where the printer driver 480 later gives the printing apparatus 320 an instruction to perform printing based on the bitmap image data, enables the printing apparatus 320 to perform printing with the accurate original size.

Figure 6:
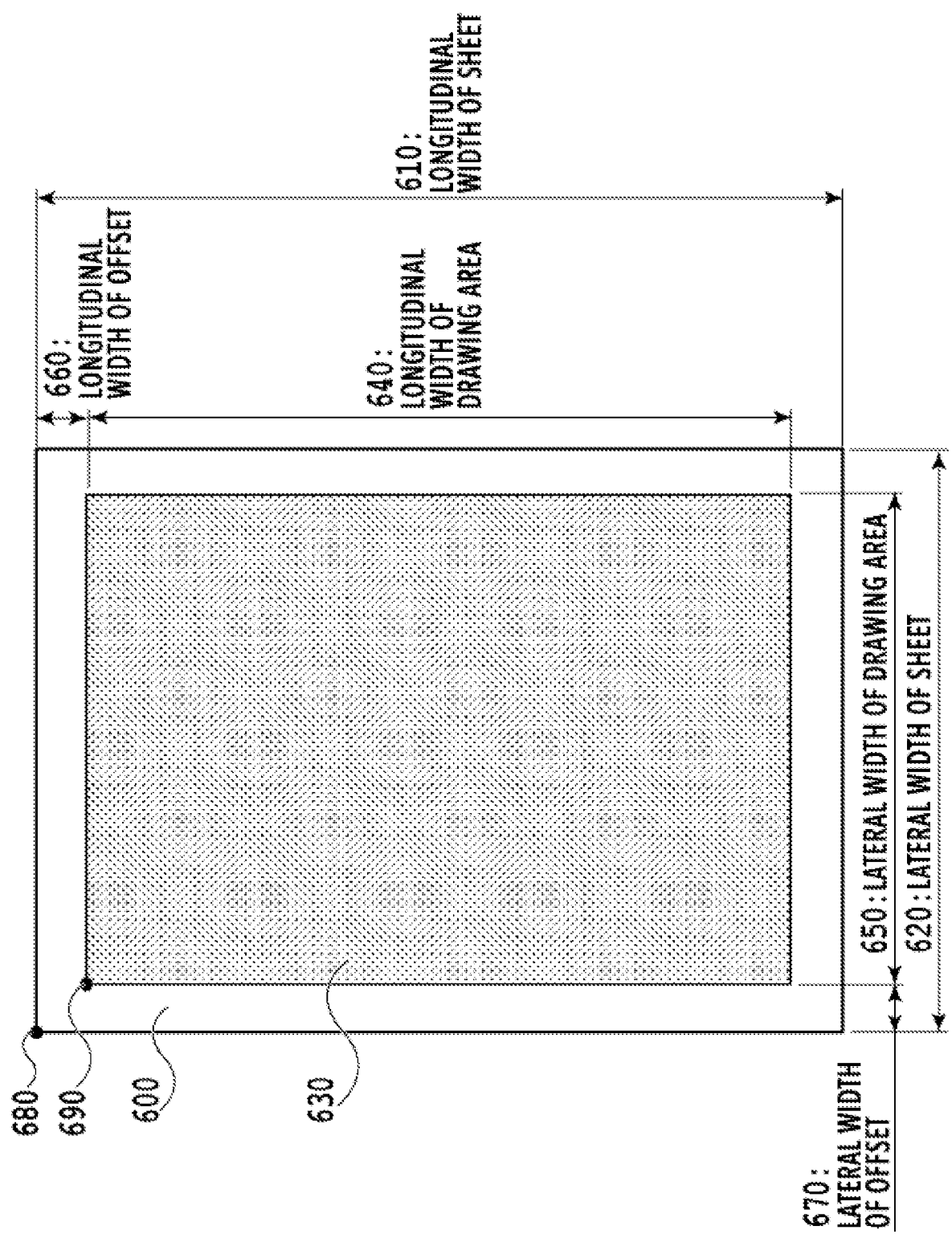
FIG. 6 is a diagram illustrating the relationship between sheet size and the drawing area.

Here, description will be provided for the size information (specifically, information such as sheet size, drawing area size, resolution, and an offset) included in the capability information on the printer driver obtained at S530, with reference to FIG. 6. FIG. 6 is a diagram illustrating the relationship between sheet size and the drawing area.

The rectangular area 600 shows the size of a sheet (or sheet size) used for printing, and the sheet size is expressed by the longitudinal width 610 and the lateral width 620. The rectangular area 630 shows the area on which the printer can perform printing (in other words, the drawing area), and the size of the drawing area is expressed by the longitudinal width 640 and the lateral width 650. The offset indicates the position of the starting point 690 of the drawing area in a case where the upper left portion 680 of the sheet is used as the reference, and the offset size is expressed by the longitudinal width 660 and the lateral width 670.

Next, description will be provided for writing the size information obtained from the printer driver 480 into a PT, with reference to FIG. 7.

The portion in the rectangular area 700 at an upper portion of the PT shows the header portion of the PT. This header portion stores information for identifying this PT. The portion in the rectangular area 710 stores default print setting information held by the virtual printer driver 460 from the beginning, including information, for example, sheet size and sheet orientation. The portion in the rectangular area 720 at a lower portion of the PT includes the size information extracted from the capability information on the printer driver 480 at S540 described above.

The underline 721 in FIG. 7 indicates the lateral width (unit: px) of the sheet, which corresponds to the lateral width 620 of the sheet in FIG. 6. Similarly, the underline 722 indicates the longitudinal width of the sheet (unit: px), which corresponds to the longitudinal width 610 of the sheet in FIG. 6.

The underline 723 in FIG. 7 indicates the lateral width (unit: px) of the drawing area, which corresponds to the lateral width 650 of the drawing area in FIG. 6. Similarly, the underline 724 indicates the longitudinal width of the drawing area (unit: px), which corresponds to the longitudinal width 640 of the drawing area in FIG. 6.

The underline 725 in FIG. 7 indicates the lateral width (unit: px) of the offset, which corresponds to the lateral width 670 of the offset in FIG. 6. Similarly, the underline 726 indicates the longitudinal width of the offset (unit: px), which corresponds to the longitudinal width 660 of the offset in FIG. 6.

The underline 727 indicates the resolution in the lateral direction (unit: dpi), and the underline 728 indicates the resolution in the longitudinal direction (unit: dpi).

Note that although in the present embodiment, information on the printer driver is written using Property as in the rectangular area 720, Property names and elements are not limited to these examples. In addition, information written in a PT is not limited to sheet size, drawing area size, offset size, and resolution described in the present embodiment, but other capability information on the printer driver, in addition to the size information, may be written in a PT.

Returning to the flowchart of FIG. 5, at S550, the print control unit 425 instructs the virtual printer driver 460 to perform a printing process. According to this instruction, the PT in which the size information was written at S540 and the drawing data generated by the drawing-data generating unit 423 based on the print information set by the print-information setting unit 421 are passed to the virtual printer driver 460.

At S560, the process after the operation of the virtual printer driver 460 is performed. Note that details of the process at S560 will be described later with reference to FIG. 9.

Next, description will be provided for a case where the determination result at S520 is false. In this case, since the printer driver is an XPS printer driver, it is not necessary to convert the format of the print data (XPS file) generated using the WPF application. Thus, at S570, the print control unit 425 instructs the printer driver to perform a printing process based on the drawing data included in the print data.

The above is the description of the operation of the application in the present embodiment.

<Operation of Virtual Printer Driver>

Next, the operation of the virtual printer driver 460 will be described with reference to FIG. 8. The procedure illustrated in FIG. 8 starts in a case where the printing process is instructed at S550 described above, and the process proceeds to S810.

At S810, the virtual printer driver 460 receives the print data (XPS file) in the XPS format generated by the application 420. The information obtaining unit 462 takes out the PT from the received print data and determines whether the taken-out PT has the size information. This size information was written into the PT at S540. In a case where the determination result in this step is true, the process proceeds to S820. On the other hand, in a case where the determination result in this step is false, the series of processes ends. With this operation, in a case where the user unintentionally uses the virtual printer driver 460, nothing happens.

At S820, the information obtaining unit 462 obtains the size information written in the PT.

Here, there is one thing to keep in mind. A module in the virtual printer driver 460 instructed to perform a printing process by the application 420 performs a validation process (a process to assure the validity of print data) for checking whether the print data is appropriately described and constructed. The virtual printer driver 460 needs to be configured to keep the size information added to the PT from being deleted in the validation process.

An example of such a virtual printer driver is a virtual printer driver equipped in advance with a module (which will be called a saving module) for saving the size information. The saving module saves size information written in a PT to a predetermined storage area before the validation process. After that, the validation process is performed on the PT, and the result of the validation process is returned to the system. Then, the saving module writes back the saved size information into a PT. Such a configuration of the virtual printer driver enables the validation process to be performed with the size information kept. Note that the saving process and the validation process are executed by the virtual printer driver 460 before the procedure in FIG. 8 starts. Specifically, on receiving a print instruction, the application 420 adds the size information to the PT obtained from the virtual printer driver 460 by executing the process illustrated in FIG. 5. Then, the application 420 requests the virtual printer driver 460 to execute the validation process on the PT to which the size information is added. On receiving this request, the virtual printer driver 460 copies and saves the size information described in the received PT. Then, the virtual printer driver 460 executes the validation process based on the PT received from the application. As a result of this validation process, a PT is generated. Note that since the PT generated as a result of this validation process does not include the size information, the virtual printer driver 460 writes the saved size information into the PT as the result of the validation process and returns the PT to the application 420.

At S830, the data conversion unit 463 converts the drawing data in the XPS format into bitmap image data on a page-by-page basis based on the size information obtained at S820. Although a renderer in the OS can be used for the conversion in this step, the virtual printer driver 460 may include its own renderer. Note that in the conversion in this step, the entire one page is not converted at a time, but the conversion is performed on a band-by-band basis. The conversion on a band-by-band basis has an effect of reducing the HDD capacity and memory necessary for the conversion into bitmap image data. In addition, the conversion on a band-by-band basis provides a higher throughput in a case where when the printer driver 480 is later instructed to execute a printing process based on the bitmap image data, the printer driver 480 can perform the process on a band-by-band basis. Note that although here, description was provided assuming that the data format after the conversion was bitmap, the data format after the conversion is not limited to bitmap, but it may be another type, such as PNG and JPEG.

At S840, the virtual printer driver 460 outputs the bitmap image data obtained at S830 on a band-by-band basis into a predetermined local folder one after another. The above is the description of the operation of the virtual printer driver 460 in the present embodiment.

<Operation of Application after Operation of Virtual Printer Driver>

Figure 9:
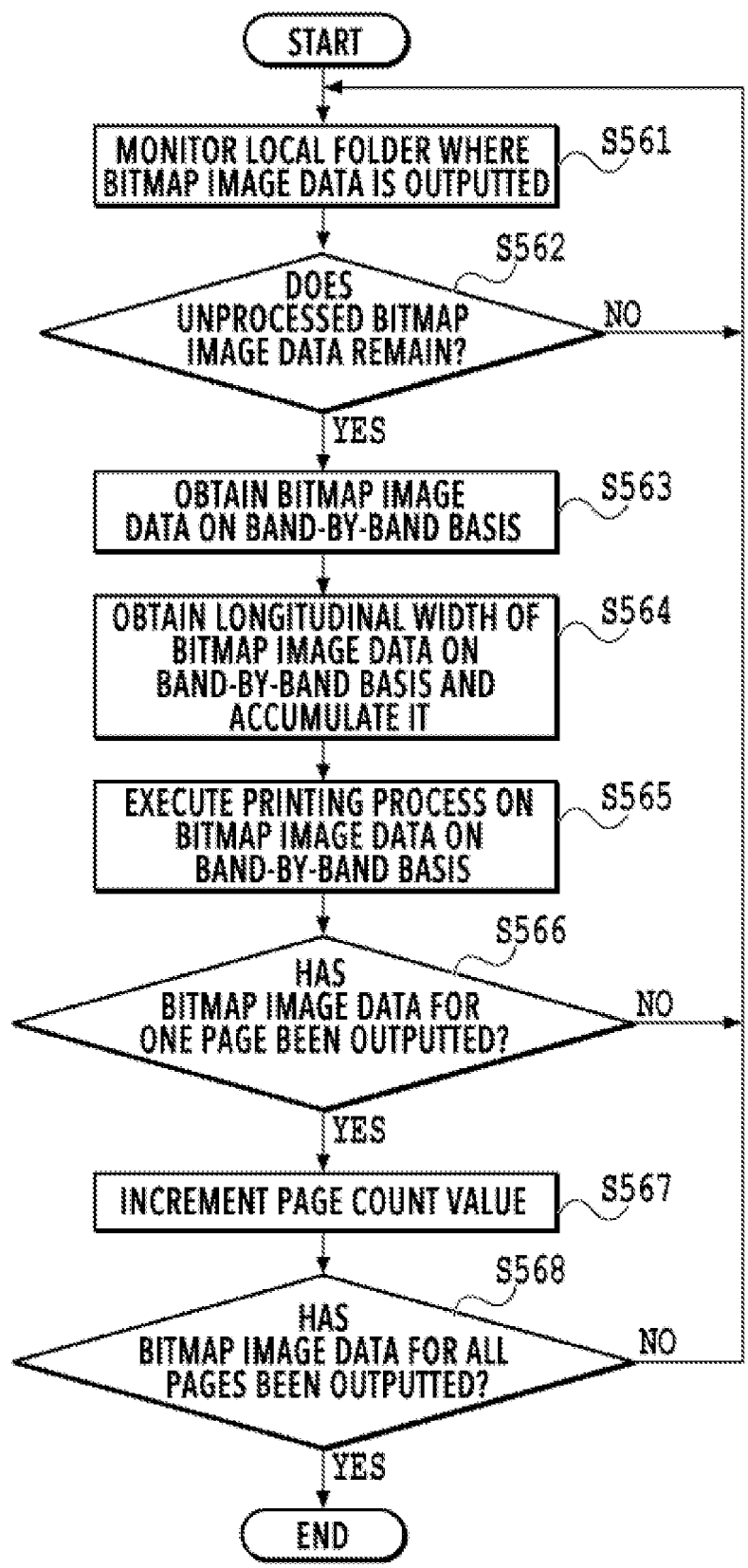
FIG. 9 is a flowchart illustrating the operation of the application after the operation of the virtual printer driver in the first embodiment.

Next, description will be provided for the operation of the application 420 after the operation of the virtual printer driver 460 with reference to FIG. 9. FIG. 9 is a detailed flowchart illustrating the process in S560 in FIG. 5.

At S561, the print control unit 425 monitors the local folder into which the bitmap image data is outputted by the virtual printer driver 460.

At S562, the print control unit 425 determines whether the local folder for monitoring contains unprocessed bitmap image data. In a case where the determination result in this step is true, the process proceeds to S563; on the other hand, in a case where the determination result is false, the process returns to S561, and monitoring the local folder is continued.

At S563, the print control unit 425 obtains bitmap image data on a band-by-band basis.

At S564, the print control unit 425 obtains the number of pixels in the longitudinal direction (which will be called the number of longitudinal pixels) of the image expressed by the bitmap image data obtained at the latest S563. The number of longitudinal pixels of each page is accumulated every time it is obtained at S564, and the accumulated value is retained.

At S565, the print control unit 425 instructs the printer driver 480 to execute a printing process based on the bitmap image data on a band-by-band basis using GDIAPI, which is an API for drawing, specific to OS. With the instruction in this step, equal-magnification printing is performed with the print setting set by the print-information setting unit 421. This is because the virtual printer driver generates the bitmap image data based on the size information described in the PT. Note that the bitmap image data the printing process with which has been completed may be deleted to increase the available space in the HDD.

At S566, the print control unit 425 determines whether bitmap image data for one page has been passed to the printer driver 480. Specifically, it compares the number of longitudinal pixels accumulated at S564 and the longitudinal width of the drawing area written in the PT at S540 (which corresponds to the longitudinal width 640 of the drawing area in FIG. 6). Then, in a case where these values agree with each other, it is determined that the bitmap image data for one page has been passed to the printer driver 480. In a case where the determination result in this step is true, the process proceeds to S567; on the other hand, in a case where the determination result is false, the process returns to S561.

At S567, the print control unit 425 counts up a parameter indicating how many pages of bitmap image data have been passed to the printer driver 480 (increments a page counting value).

The reason of this procedure is to make it possible for the application 420 to determine whether bitmap image data for one page has been passed to the printer driver 480 even in a case where the width of the band on the basis of which the data conversion is performed at S830 is changed.

At S568, the print control unit 425 determines whether bitmap image data for all pages has been passed to the printer driver 480. Specifically, it compares the number as the result of counting up at S567 and the number of pages of the print data passed to the virtual printer driver 460 when the instruction to perform printing was given to the virtual printer driver 460. Then, in a case where these numbers agree with each other, it is determined that the bitmap image data for all pages has been passed to the printer driver 480. In a case where the determination result in this step is true, the series of processes ends; on the other hand, in a case where the determination result is false, the process returns to S561. The above is the description of the operation of the application after the operation of the virtual printer driver in the present embodiment.

Here, description will be provided for the reason why the virtual printer driver 460 generates bitmap image data based on the size information included in the PT. For example, in a case where the user sets A4 size, the printer driver 480 generates PDL data based on the size corresponding to the drawing area illustrated in FIG. 6. Here, the aspect ratio of the drawing area illustrated in FIG. 6 is called the first aspect ratio. Meanwhile, in a case where the application 420 does not write the size information in a PT unlike the present embodiment, the virtual printer driver 460 cannot obtain size information from the PT. Thus, the virtual printer driver 460 may generate bitmap image data at a second aspect ratio which is different from the first aspect ratio. As a result, bitmap image data at the second aspect ratio generated by the virtual printer driver 460 is passed to the printer driver 480 via the application 420. Then, the printer driver 480 converts the bitmap image data at the second aspect ratio into data at the first aspect ratio based on the designation of A4 size before generating page description language (PDL) data. Due to this operation, the drawing data generated by the application 420 may deteriorate. On the other hand, in the present embodiment, the virtual printer driver 460 generates bitmap image data based on the size information contained in the PT, making it possible to generate bitmap image data at the first aspect ratio. In addition, the size of bitmap image data is a size that allows equal-magnification printing. Then, the printer driver 480 generates page description language data (PDL data) based on such bitmap image data, which operation reduces the deterioration described above.

<Modification and Effect of Present Embodiment>

Note that in the above embodiment, the print control unit 425 of the application 420 instructs the printer driver 480 to execute a printing process based on bitmap image data on a band-by-band basis. However, instead of a module of the application 420, a module of the virtual printer driver 460 may instruct the printer driver 480 to execute a printing process based on bitmap image data. This configuration can be achieved by describing the identification name of the printer driver 480 and information on the print setting to be used when the printer driver 480 executes a printing process, into the PT passed from the application 420 to the virtual printer driver 460 with the instruction to execute the printing process.

In addition, although in the above embodiment, the virtual printer driver 460 is used to convert drawing data in the XPS format into bitmap image data, the present embodiment is not limited to this configuration. As another configuration, for example, the application 420 may have a data conversion unit that converts drawing data in the XPS format into bitmap image data.

The application 420 may operate as a plug-in for another application included in the PC 400.

As has been described above, in the present embodiment, drawing data in the XPS format generated by an application is rasterized by the virtual printer driver before the printer driver performs the printing process. At this time, the virtual printer driver generates bitmap image data based on size information obtained from the printer driver 480 according to print information set by the user. With this operation, the application 420 can pass bitmap image data the size of which needs no change at the printer driver 480 to the printer driver 480. This operation enables printing in which the deterioration of images is reduced without installing printer drivers supporting different multiple print data formats for each printer, in the environment where different types of print data coexist.

Second Embodiment

In the first embodiment, the virtual driver is a module that converts drawing data in the XPS format into bitmap image data and outputs the converted data. However, the virtual printer driver may have another function. In a case where one virtual printer driver has multiple functions, the function in use may be switched using a PT.

In the present embodiment, a system having an application capable of editing print data and printing the result of the edit uses one virtual printer driver to performs output of print data (XPS file) to be inputted to the application and printing via the virtual driver.

Note that in the following, description will be mainly provided for the difference from the embodiment already described, and description of the same configurations as in the embodiment already described will be omitted as appropriate.

<Software Configuration of Information Processing Apparatus>

Figure 10:
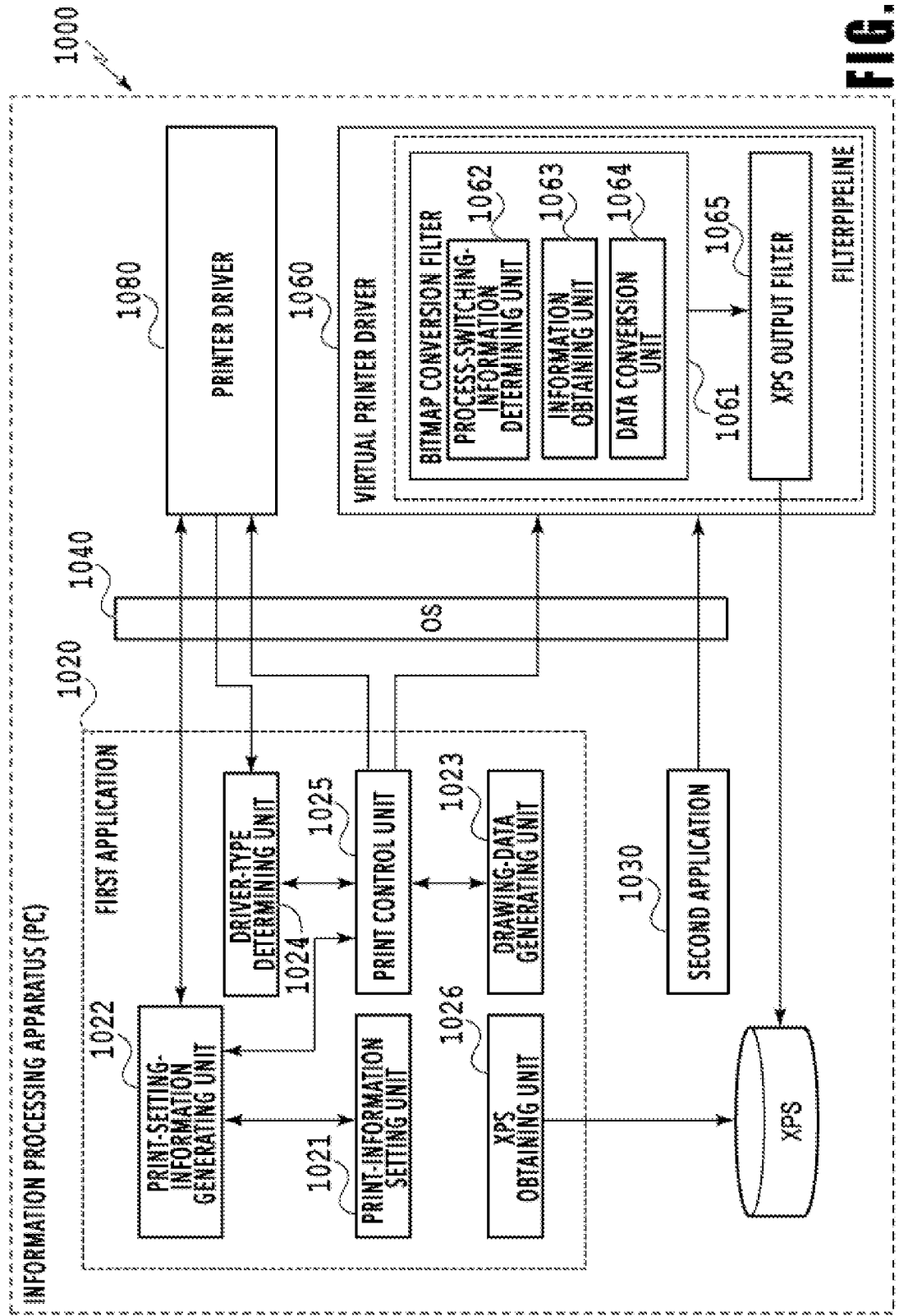
FIG. 10 is a block diagram illustrating the function configuration (software configuration) of an information processing apparatus in a second embodiment.

Next, description will be provided for the software configuration of an information processing apparatus (PC) according to the present embodiment with reference to FIG. 10. Note that also in the present embodiment, description will be provided assuming as in the first embodiment that a first application 1020 is a WPF application, that print setting information is a PT, and that a virtual printer driver 1060 is an XPS printer driver.

As illustrated in the figure, the first application 1020 includes, as modules having the same functions as those in the first embodiment (see FIG. 4), a print-information setting unit 1021, drawing-data generating unit 1023, driver-type determining unit 1024, and print control unit 1025. In addition to these modules, the first application 1020 also includes a print-setting-information generating unit 1022 having functions part of which is different from those of the print-setting-information generating unit 422 of the application 420 in the first embodiment. The first application 1020 further includes an XPS obtaining unit 1026 which the application 420 does not have.

A second application 1030 includes a generation function of generating print data and a function of printing the generated print data, specifying a printer driver (such as a printer driver 1080 and the virtual printer driver 1060) as the output destination.

Next, the virtual printer driver 1060 will be described. The virtual printer driver 1060 includes a bitmap conversion filter 1061 for converting received print data into bitmap image data and an XPS output filter 1065 for outputting XPS files.

The bitmap conversion filter 1061 includes a process-switching-information determining unit 1062, information obtaining unit 1063, and data conversion unit 1064.

The process-switching-information determining unit 1062 obtains process switching information written in the PT included in received print data. The values of the process switching information obtained here make a difference in the process that the virtual printer driver 1060 executes later.

The information obtaining unit 1063 has a function similar to the one of the information obtaining unit 462 in the first embodiment and obtains size information written in a PT included in print data.

The data conversion unit 1064 has a function similar to the one of the data conversion unit 463 in the first embodiment. In other words, the data conversion unit 1064 performs conversion of print data based on the size information obtained by the information obtaining unit 1063, specifically, conversion from drawing data in the XPS format into bitmap image data.

The XPS output filter 1065 has a function of outputting the print data that the virtual printer driver 1060 received as an XPS file.

<Operation of Virtual Printer Driver>

Here, description will be provided for the operation of the virtual printer driver 1060 in a case where the first application 1020 or the second application 1030 instructs the virtual printer driver 1060 to execute a printing process.

In the present embodiment, in a case where the second application 1030 instructs the virtual printer driver 1060 to execute a printing process, a printing process not involving creation of a special PT unlike the description in the first embodiment is executed.

On the other hand, in a case where the first application 1020 instructs the virtual printer driver 1060 to execute a printing process, a printing process involving writing size information into a PT as described in the first embodiment is executed. However, the contents written in a PT in the present embodiment includes not only the size information described in the first embodiment but also process switching information 1110 as illustrated in FIG. 11. The "process switching information" is information for specifying process details to be executed. In the example illustrated in FIG. 11, the value of "Model" is written in the PT as process switching information. Note that the value of the process switching information 1110 is not limited to this one, but it may be any value recognizable by the process-switching-information determining unit 1062 of the virtual printer driver. In other words, the first application can write the size information described in the first embodiment and process switching information into a PT.

In a case where the first application 1020 or the second application 1030 instructs the virtual printer driver 1060 to execute a printing process, print data is passed to the filter pipeline of the virtual printer driver 1060 via the OS 1040. First, this print data is passed to the bitmap conversion filter 1061, where the print data is converted into bitmap image data. Then, in a case where the process at the bitmap conversion filter 1061 is completed, the processed print data is passed to the XPS output filter 1065.

Figure 12:
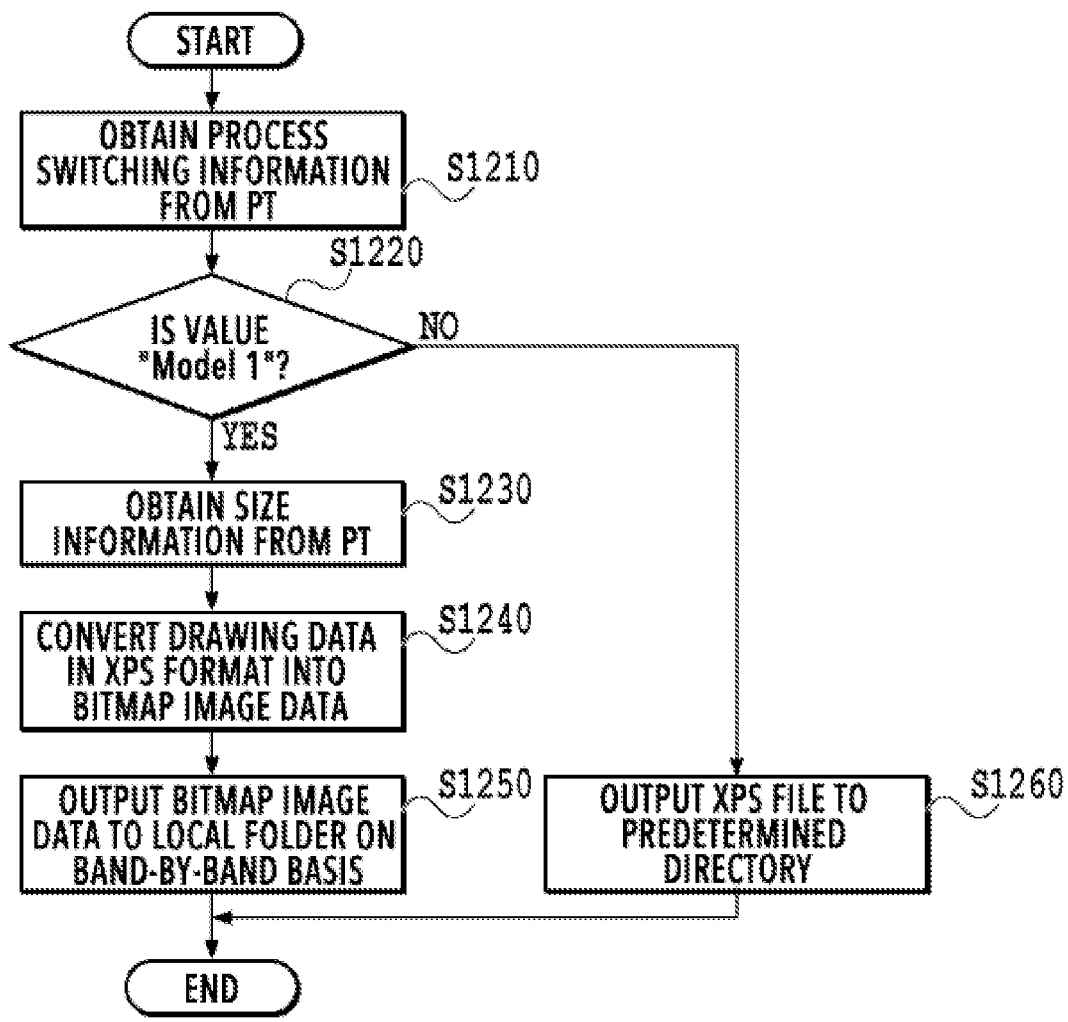
FIG. 12 is a flowchart illustrating the operation of a virtual printer driver in the second embodiment.

Next, the operation of the virtual printer driver 1060 will be described with reference to FIG. 12.

At S1210, the process-switching-information determining unit 1062 takes out the PT from the XPS file that the virtual printer driver 1060 has received and obtains process switching information (see FIG. 11) written in the taken-out PT.

At S1220, the process-switching-information determining unit 1062 determines whether the value of the process switching information obtained at S1210 is "Model". In a case where the determination result in this step is true, the process proceeds to S1230; on the other hand, in a case where the determination result is false, the process proceeds to S1260.

Figure 8:
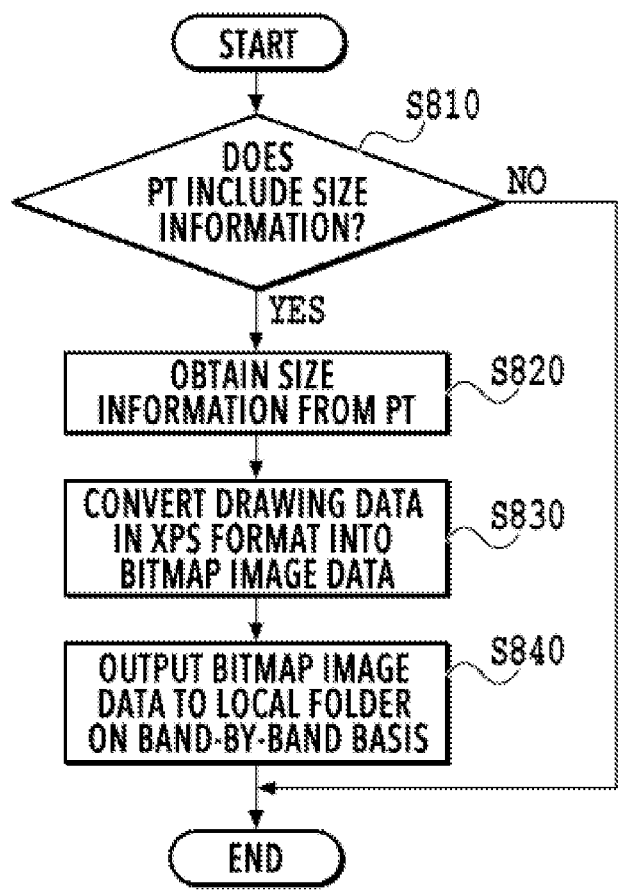
FIG. 8 is a flowchart illustrating the operation of a virtual printer driver in the first embodiment.

The processes in S1230 to S1250 which are executed in a case where the determination result at S1220 is YES are the same as those of S820 to S840 in the first embodiment (see FIG. 8). Specifically, the information obtaining unit 1063 obtains the size information (see FIG. 11) written in the PT (S1230), and the data conversion unit 1064 converts the drawing data in the XPS format into bitmap image data using the obtained size information (S1240). The bitmap image data thus obtained is outputted to a predetermined local folder as in the first embodiment (S1250).

On the other hand, in a case where the determination result at S1220 is NO, the XPS output filter 1065 outputs the XPS file to the predetermined directory at S1260. The XPS obtaining unit 1026 of the first application 1020 obtains the XPS file outputted by the XPS output filter 1065 from the predetermined directory.

Here, description will be provided for the operation of the virtual printer driver 1060 in a case where the second application 1030 instructs the virtual printer driver 1060 to execute a printing process. In this case, process switching information is not included in the PT, unlike the case described above. Accordingly, a process for conversion into bitmap image is not performed, but the XPS output filter 1065 outputs the XPS file (NO at S1220 and the process at S1260).

On the other hand, in a case where the first application 1020 instructs the virtual printer driver 1060 to execute a printing process, process switching information is included in the PT, and the size information can also be obtained. Accordingly, the XPS output filter 1065 does not output an XPS file, but bitmap image data generated by rasterization using the size information is outputted (YES at S1220 and the processes through S1250). The above is the description of the operation of the virtual printer driver 1060 in the present embodiment.

<Operation of Application after Operation of Virtual Printer Driver>

Next, description will be provided for the operation of the first application 1020 after the operation of the virtual printer driver 1060. The operation of the first application 1020 in a case where the bitmap image data generated by the bitmap conversion filter 1061 is outputted is the same as that of the application 420 in the first embodiment.

In a case where the XPS output filter 1065 outputs the XPS file, the XPS obtaining unit 1026 of the first application 1020 obtains the outputted XPS file. The above is the description of the operation of the application after the operation of the virtual printer driver in the present embodiment.

<Advantageous Effects of Present Embodiment>

The present embodiment makes it possible to output print data (an XPS file) to be inputted to the first application and perform printing via the virtual printer driver, switching between these two processes, using one virtual printer driver.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

The present invention reduces chances where output results as intended by the user cannot be obtained in the environment where print data in different formats coexists.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-101393, filed May 28, 2018, which is hereby incorporated by reference wherein in its entirety.

What is claimed is:

1. An information processing apparatus comprising:
a specifying unit configured to, in a case where a printer driver corresponding to a printer specified by a user as an output destination via an application generating drawing data in a second format is a printer driver configured to generate page description language data based on drawing data in a first format different from the second format, specify size information obtained from the printer driver; and
a generation unit configured to generate bitmap image data based on the size information and the drawing data in the second format,
wherein the specifying unit and the generation unit are implemented by at least one processor of the information processing apparatus,
wherein the application outputs the bitmap image data output by the generation unit to the printer driver, and
wherein the printer driver generates page description language data based on the bitmap image data.

2. The information processing apparatus according to claim 1, further comprising an obtaining unit configured to obtain the size information from the printer driver in the case where the printer driver corresponding to the printer specified by the user as the output destination via the application is the printer driver configured to generate page description language data based on drawing data in the first format,
wherein the obtaining unit is implemented by the at least one processor of the information processing apparatus, and
wherein the generation unit generates the bitmap image data as data that does not require the conversion process by the conversion unit of the operating system.

3. The information processing apparatus according to claim 2, further comprising:
a save unit configured to save the size information written in a PrintTicket before a validation process to assure validity of print data is performed; and
a write-back unit configured to write back the saved size information to a PrintTicket generated in the validation process after the validation process is performed,
wherein the save unit and the write-back unit are implemented by the at least once processor of the information processing apparatus.

4. The information processing apparatus according to claim 1, wherein another printer driver configured to generate page description language data based on drawing data in the second format is operable in the information processing apparatus, and
in a case where the printer driver corresponding to the printer specified by the user as the output destination via the application is not the printer driver configured to generate page description language data based on drawing data in the first format, the other printer driver generates page description language data based on drawing data in the second format generated by the application.

5. The information processing apparatus according to claim 4, wherein the other printer driver configured to generate page description language data based on drawing data in the second format is an XPS printer driver.

6. The information processing apparatus according to claim 1, wherein the printer driver configured to generate page description language data based on drawing data in the first format is a GDI printer driver.

7. The information processing apparatus according to claim 1, further comprising a determining unit configured to determine whether the printer driver corresponding to the printer specified by the user as the output destination via the application is the printer driver configured to generate page description language data based on drawing data in the first format,
wherein the determining unit is implemented by the at least one processor of the information processing apparatus, and
in a case where it is determined that the printer driver corresponding to the printer specified by the user as the output destination via the application is the printer driver configured to generate page description language data based on drawing data in the first format, the generation unit generates the bitmap image data.

8. A method of controlling an information processing apparatus, the method comprising:
in a case where a printer driver corresponding to a printer specified by a user as an output destination via an application generating drawing data in a second format is a printer driver configured to generate page description language data based on drawing data in a first format different from the second format, specifying size information obtained from the printer driver; and generating bitmap image data based on the size information and the drawing data in the second format,
wherein the application outputs the bitmap image data to the printer driver, and
generating page description language data by the printer driver based on the bitmap image data.

9. The method of controlling an information processing apparatus according to claim 8, further comprising obtaining the size information from the printer driver in the case where the printer driver corresponding to the printer specified by the user as the output destination via the application is the printer driver configured to generate page description language data based on drawing data in the first format,
wherein the generating generates the bitmap image data as data that does not require the conversion process by the conversion unit of the operating system.

10. The method of controlling an information processing apparatus according to claim 9, further comprising:
saving the size information written in a PrintTicket before a validation process to assure validity of print data is performed; and
writing back the saved size information to a PrintTicket generated in the validation process after the validation process is performed.

11. The method of controlling an information processing apparatus according to claim 8, wherein another printer driver configured to generate page description language data based on drawing data in the second format is operable in the information processing apparatus, and
in a case where the printer driver corresponding to the printer specified by the user as the output destination via the application is not the printer driver configured to generate page description language data based on drawing data in the first format, the other printer driver generates page description language data based on drawing data in the second format generated by the application.

12. The method of controlling an information processing apparatus according to claim 11, wherein the other printer driver configured to generate page description language data based on drawing data in the second format is an XPS printer driver.

13. The method of controlling an information processing apparatus according to claim 8, wherein the printer driver configured to generate page description language data based on drawing data in the first format is a GDI printer driver.

14. The method of controlling an information processing apparatus according to claim 8, further comprising determining whether the printer driver corresponding to the printer specified by the user as the output destination via the application is the printer driver configured to generate page description language data based on drawing data in the first format,
wherein in a case where it is determined that the printer driver corresponding to the printer specified by the user as the output destination via the application is the printer driver configured to generate page description language data based on drawing data in the first format, the generating generates the bitmap image data.

15. A non-transitory computer-readable storage medium storing a program for causing a computer to execute a method of controlling an information processing apparatus, the program comprising code to execute:
in a case where a printer driver corresponding to a printer specified by a user as an output destination via an application generating drawing data in a second format is a printer driver configured to generate page description language data based on drawing data in a first format different from the seond format, specifying size information obtained from the printer driver; and
generating bitmap image data based on the size information and the drawing data in the second format,
wherein the application outputs the bitmap image data to the printer driver, and
generating page description language data by the printer driver based on the bitmap image data.

* * * * *